United States Patent [19]

Pollard

[11] Patent Number: 4,787,541

[45] Date of Patent: Nov. 29, 1988

[54] SUPPORT DEVICES

[75] Inventor: Ernest Pollard, Bingley, England

[73] Assignee: Automate (U.K.) Limited, Bradford, England

[21] Appl. No.: 920,677

[22] Filed: Oct. 20, 1986

[51] Int. Cl.[4] .............................................. B60R 7/08
[52] U.S. Cl. .................. 224/275; 224/42.44; 108/44
[58] Field of Search ............ 224/273, 42.42, 42.45 R, 224/42.46 R, 311, 275, 281, 42.01, 42.43, 42.44; 108/42, 44; 297/414, 415, 135, 153, 253; 296/37.8, 37.1, 37.15

[56] References Cited

U.S. PATENT DOCUMENTS

| | | | |
|---|---|---|---|
| 540,384 | 6/1895 | Hall | 297/253 |
| 645,176 | 3/1900 | Marsh | 297/253 |
| 2,668,582 | 2/1954 | Goodfellow | 297/414 |
| 2,692,069 | 10/1954 | Winters et al. | 224/275 |
| 2,751,968 | 6/1956 | Fleming | 297/414 |
| 2,825,611 | 3/1958 | Aynesworth | 224/42.44 |
| 3,279,872 | 10/1966 | Howke | 224/275 |
| 3,632,158 | 1/1972 | Boothe | 296/37.8 |
| 3,922,973 | 12/1975 | Sturgeon | 108/44 |
| 3,987,945 | 10/1976 | McDowell | 224/42.42 |
| 4,300,709 | 11/1981 | Page, Jr. | 224/275 |
| 4,524,701 | 6/1985 | Chappell | 108/44 |

FOREIGN PATENT DOCUMENTS 2647511  4/1978  Fed. Rep. of Germany .

Primary Examiner—Renee S. Luebke
Attorney, Agent, or Firm—Armstrong, Nikaido, Marmelstein & Kubovcik

[57] ABSTRACT

A support surface such as a table 23 has support arms 12, 21 for mounting the support surface on a seat or seats 10, 11 of a motor vehicle, for example for use as a picnic tray or work table.

Each support arm 12, 21 has a location portion 14 shaped such that it can be forced into the gap which exists on almost all car seats between the squab portion 10 and the upright portion 11 to be gripped thereby. There is also a foot portion 16 which is shaped to rest on the squab portion of the seat.

9 Claims, 2 Drawing Sheets

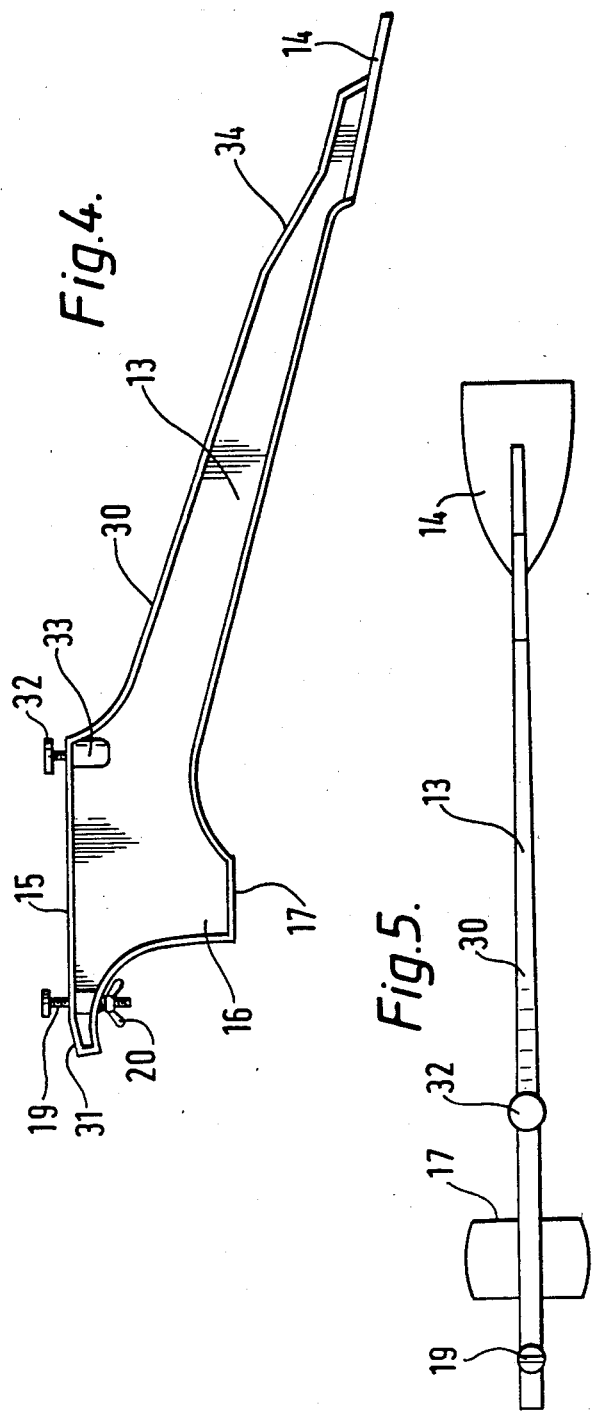

SUPPORT DEVICES

The invention relates to support devices and particularly to support devices for use in motor cars.

Motor cars and particularly modern motor cars, are very poorly equipped, if at all, with support surfaces on which to rest things such as picnic plates and picnic cups.

Attempts have been made to provide support surfaces which fasten on to an interior portion of a motor car but all such known support surfaces are either inconveniently placed for one or some occupants of the car, or can only be fitted to one particular model of car.

We have now developed a much more versatile support surface and accordingly our invention provides, according to a first aspect of the invention, a support surface such as a table, and means for mounting the support surface on a seat or seats of a motor vehicle at a convenient location.

The versatility of our invention results from the provision of a versatile support device to support the support surface and accordingly a second aspect of our invention provides a support device for mounting on the seat of a motor car, the support device comprising a location portion shaped such that it can be forced into the gap which exists on almost all car seats between the squab portion and the upright portion, to be gripped thereby, and a foot portion which is shaped to rest on the squab portion of the seat.

The location portion may comprise a flat tongue positioned at one end of an elongate member, the foot projecting downwardly from the elongate member in use.

The foot may be provided with a flange which extends horizontally in use.

The flange may be provided with a rubber pad or like device to reduce the risk of the foot slipping on the seat.

Preferably the elongate member has means to mount a support surface such as a table on its upper face.

Preferably two spaced-apart support devices are used, the support surface extending between the two support devices.

The support surface may be connectable to each of the support devices by a simple screw-threaded device such as a bolt and wing nut.

The wing nut may be captive on the bolt.

The support device may have a pair of slots therein, one to receive each bolt, each slot having an enlarged portion at a point along its length through which one of the wing nuts may be passed.

The support devices and support surface may be made of plastics material.

To facilitate the manufacture of the location devices by a molding process, the location devices may be identical to one another, rather than handed.

Means may be provided to adjust the angle of the support surface with respect to the location devices.

The adjustment means may comprise an adjustable projection which may be screwed into or out of each location device to a greater or lesser extent.

Where the support surface is provided with an upstanding rim, the rim may be extended around the said slots to strengthen the support surface in the region of the slots and prevent any liquid which is spilled on the support surface from dripping through the slots.

Each support device may be shaped, e.g. by tapering, in the region of the location portion, to ensure that if the upright portion of a car seat is tipped forwardly, the support device tends to be gripped more tightly, rather than be displaced forwardly by the movement of the upright portion of the car seat.

By way of example, specific embodiments of the invention will now be described, with reference to the accompanying drawings, in which:

FIG. 4 is a side view of an alternative embodiment of support device according to the invention;

FIG. 5 is a plan view of the support device shown in FIG. 4; and

FIG. 6 is a perspective view of part of the support surface of this embodiment.

Figure 1:
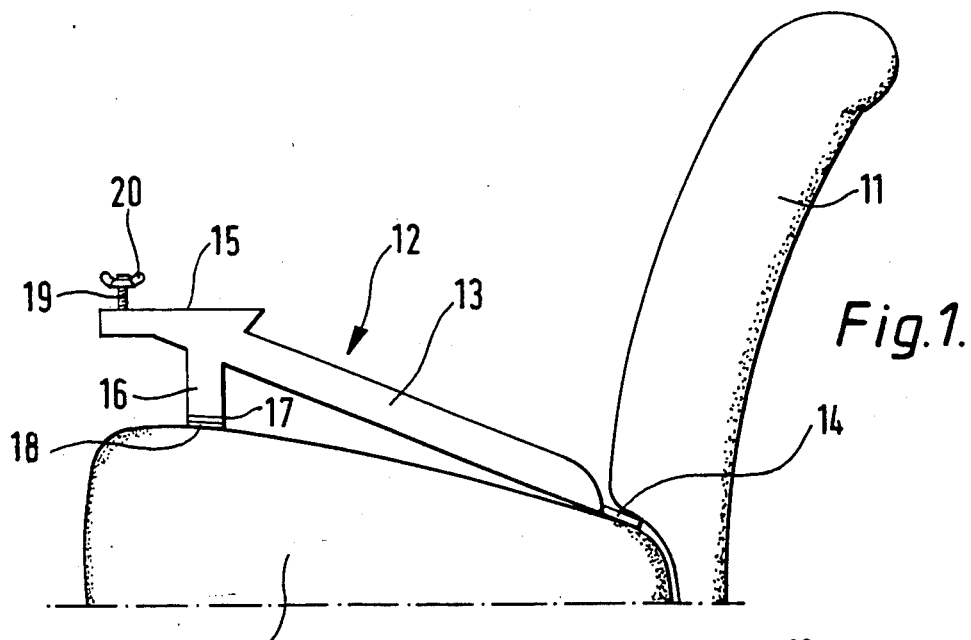
FIG. 1 is a side view of a part of a car seat provided with one embodiment of support device according to the invention.

FIG. 1 shows diagrammatically the essential portions of a typical modern car seat comprising a squab portion 10 and an upright portion 11. On the seats of virtually all cars available today there is a gap between the upholstery of the squab portion 10 and the upholstery of the upright portion 11, where these portions join. This is to accommodate the usual tilting movement of the upright portion 11.

The support device 12 shown in FIG. 1 comprises an elongate member 13 which is provided at one end with a flat tongue 14. At the other end there is a support face 15 and a downwardly extending foot 16. The foot 16 has at its lower end a flange 17 and the underside of the flange 17 is provided with a rubber pad 18. At one end of the support face 15 there is an upwardly extending fixed bolt 19 on which is threaded a wing nut 20. The upper end of the bolt 19 is peened over so that the wing nut 20 is captive on the bolt.

The support device 12 can almost instantly be mounted on the car seat, without the use of tools, by simply thrusting the tongue 14 into the gap between the squab portion 10 and the upright portion 11, where it is securely gripped by the upholstery of the seat. The foot 16 simply rests on the upper face of the squab portion 10 as shown in FIG. 1 and the dimensions of the support device, and the angle at which the elongate member 30 is inclined to the support face 15, are such that when the support device is placed in position as shown the support face 15 is substantially horizontal.

Figure 2:
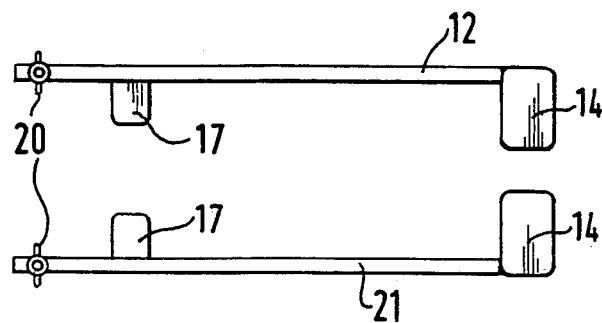
FIG. 2 is a plan view of two co-operating support devices.

In use a pair of similar support devices are used to support a table. FIG. 2 shows not only the support device 12 but also the second support device 21 which is identical to the support device 12 except that it is a mirror image thereof.

Figure 3:
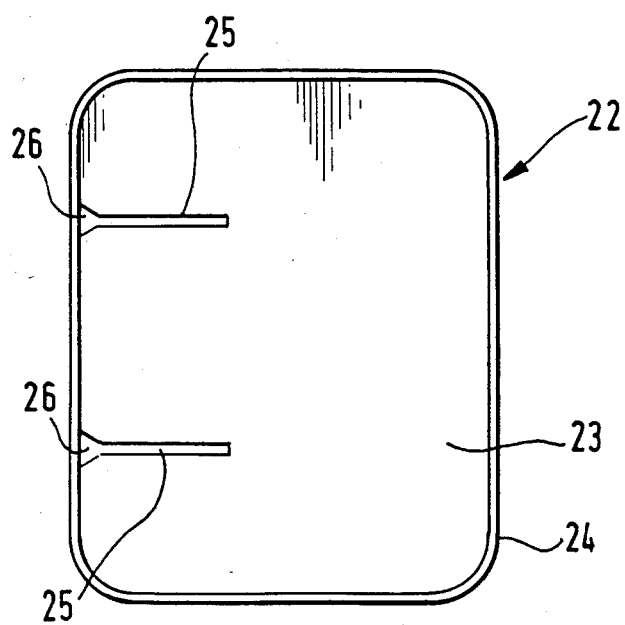
FIG. 3 is a plan view of a table arranged for attachment to the support devices shown in FIG. 2.

The table 22 shown in FIG. 3 simply comprises a flat surface 23 having an upstanding rim 24 and two slots 25. Each slot 25 is enlarged at 26 in a triangular manner, each enlarged portion 26 being big enough for one of the wing nuts to be passed therethrough.

In order to mount the table the two support devices 12 and 21 are adjusted until the two wing nuts 20 are spaced-apart by a distance which is equal to the distance between the two slots 25. The table is then placed on the two support faces 15, bridging the gap between the two support devices, such that the wing nuts 20 pass through the enlarged portions 26. The table is then slid forwardly with respect to the motor car until the wing nuts 20 are positioned over the narrower portion of the slots 25. The wing nuts can then be screwed down to engage the upper face of the table and hold the table securely in position.

The device shown in FIGS. 1 to 3 can be securely but very rapidly mounted in virtually any make of car in a position particularly convenient to the occupants of the car. For example the table can be positioned between a driver and a front seat passenger, regardless of the shape or position of the front seats. Even if there is a fairly substantial gap between the front seats, the support devices can be arranged in a secure position with the wing nuts 20 the appropriate distance apart. If necessary, the support devices can be arranged with the flanges 17 and tongues 14 pointing away from one another, instead of towards one another as shown in FIG. 2. This will enable the flanges 17 to engage at least the edge of the seats even if they are spaced quite widely apart.

The position of the front seats of a motor vehicle can normally be adjusted in the fore and aft direction in modern cars. Frequently the driver's seat will be further forward or further back than the passenger seat but this does not make any difference to the use of the device. Not only need the two support devices not be parallel to one another as shown in FIG. 2, provided that the wing nuts 20 are at the necessary distance apart, but the front ends of the support devices need not be aligned as shown in FIG. 2. If one seat is further forward than the other, so that one of the support devices 12 or 21 is further to the right or left than the other as viewed in FIG. 2, the tray can still be securely fixed in an appropriate position. All that will happen is that one of the wing nuts 20 will be further along one of the slots 25 than the other wing nut.

The advantage of a picnic tray which is readily accessible by both a driver and front seat passenger are obvious. However the device shown in FIGS. 1 to 3 can equally well be mounted on a rear seat of a motor car at any desired location along the seat.

The upstanding rim 24 of the tray assists in preventing picnic cups or the like from being knocked off the tray. If however a completely flat surface is required, for example for writing upon, the tray can be turned over so that the rim extends downwardly.

The support device shown in FIGS. 4 and 5 is identical in principle to that of the first embodiment. In other words the device comprises an elongate member 13 which is provided at one end with a flat tongue 14. At the other end there is a support face 15 and a downwardly extending foot 16. The foot 16 has at its lower end a flange 17.

The support devices of the first embodiment are handed, as can be seen from FIG. 2. The support devices of this embodiment are identical. As can be seen from FIG. 5, the tongue 14 and flange 17 are arranged to project by equal amounts on each side of the elongate member 13. The elongate member 13 is an integral plastics molding comprising a central web surrounded by a strengthening flange 30.

As in the first embodiment, the support device is provided with a bolt 19 and wing nut 20 for attaching a tray. However in this embodiment the wing nut 20 is arranged underneath the support face 15. The leading edge 31 of the support face 15 is angled downwardly to assist in sliding a tray on to the support face.

To enable the angle of the tray to be adjusted with respect to the support face 15, a projection 32 is provided comprising a disc from which a threaded shank projects. The threaded shank can be screwed to a greater or lesser extent into a molded socket 33. The disc 32 abuts the underside of the tray, the angle of the tray being dependent upon the height to which the disc 32 is adjusted.

The elongate member 13 is tapered at 34 such that when the device is used with a car in which the upright portions of the car seats can be tipped forwardly, the tipping forward of the upright portions of the seats tends to cause the elongate member 13 to be gripped more tightly. If the elongate member was not tapered at 34, there would be a risk that tipping the upright portions of the seats forwardly would cause the elongate member 13 to be displaced in the forward direction.

As with the first embodiment, the device includes a support surface in the form of a tray or table 22, part of which is shown in FIG. 6. The tray has slots 25 to receive the bolts, and has an upstanding rim 24. In this embodiment the rim 24 is continued around the slot 25. This not only stengthens the tray in the region of the slot, but also prevents any liquid which might be spilled on to the tray from dripping through the slot 25. The mouth of the slot is flared outwardly at 35 to assist in engaging the bolts 19 with the slots.

The invention is not restricted to the details of the foregoing embodiments. For instance, although the support devices are shown being used to support a picnic tray, the devices may also be used to mount other things, for example a small desk surface or other working surface, for example for use by a sales representative.

The support device and support surface may be made of any convenient material, for example, wood, plastics, metal, alloy, aluminium, or any combination thereof.

I claim:

1. A support device for use in a motor vehicle having at least one seat comprising: a generally planar support table having an upper face, a lower face, a front edge and a rear edge; a pair of support means for supporting the table on said at least one seat; mounting means for mounting the lower face of said table on the support means leaving the upper face of the support table exposed for use in a generally horizontal position; each support means having a location portion shaped such that it can be forced into a gap normally found between a seat cushion and an upright portion of a motor vehicle seat to be gripped thereby, and a foot means for resting on the seat cushion of the seat at a location removed from the gap; at least the location portions of the support means being adjustable towards and away from one another, and said mounting means being mountable to the table at a plurality of locations extending, in use, generally in a direction extending between the front and rear edges of the support table so that one of the support means can be mounted to the table at a position on the table which is spaced in said direction from the position on the table at which another support means is mounted.

2. A support device as claimed in claim 1, wherein the location portion comprises a flat tongue positioned at an end of the support means, the foot means projecting downwardly from the support means in use.

3. A support device as claimed in claim 1 or 2, wherein an end of the foot means which rests on the seat cushion is provided with a horizontal flange.

4. A support device as claimed in claim 1, further including adjustment means for adjusting the angle of the table with respect to the support means.

5. A support device as claimed in claim 4, wherein the adjustment means comprises an adjustable projection which may be screwed into or out of the support means to a desired extent.

6. A support device as claimed in claim 1, 2 or 5, wherein slots are located in said table, and said mounting means engage said slots.

7. A support device as claimed in claim 6, wherein the table has an upstanding rim which extends around said slots to stengthen the table and to prevent any liquid which is spilled on the table from dripping through the slots.

8. A support device for use in a motor vehicle having at least one seat comprising: a generally planar support table having an upper face, a lower face, a front edge and a rear edge; a pair of support arms; means for mounting the support arms under the lower face of the support table leaving the upper face of the support table exposed for use; each support arm having a location portion shaped such that it can be forced into a gap normally found between a seat cushion and an upright portion of a motor vehicle seat to be gripped thereby, and a foot portion which is shaped to rest on a seat cushion; at least the location portions of the support arms being adjustable towards and away from one another, and each support arm being adjustable in a direction extending between the front and rear edges of the support table.

9. A support device for mounting a table on at least one seat of a motor vehicle, said device including a generally planar table and at least two support means for supporting the table on the at least one seat, said support means each including mounting means for mounting said table on the support means in a generally horizontal position, a location portion which is insertable into a gap normally located between a seat cushion and an upright portion of a seat to be gripped thereby, and a foot means for resting on a seat cushion of a seat at a location removed from the gap, the location portions of the at least two support means having, in use, a variable distance therebetween, said mounting means being mountable to the table at a plurality of locations extneding generally in the direction the seat is facing, so that one of the support means can be mounted to the table at a position on the table which is spaced in said direction from the position on the table at which another support means is mounted.

* * * * *